United States Patent [19]

Swanson, III

[11] Patent Number: 5,722,150
[45] Date of Patent: Mar. 3, 1998

[54] METHOD OF FORMING ATTACHMENT OF A HOSE TO A FITTING

[75] Inventor: Ted A. Swanson, III, Austin, Tex.

[73] Assignee: BLR Enterprises, San Marcos, Tex.

[21] Appl. No.: 778,611

[22] Filed: Jan. 6, 1997

[51] Int. Cl.$^6$ ................................................. B21D 39/00
[52] U.S. Cl. ..................... 29/508; 29/516; 285/256; 285/908
[58] Field of Search ..................... 285/256, 259, 285/258, 908, 93; 29/508, 516, 890.14, 890.141

[56] References Cited

U.S. PATENT DOCUMENTS

| 2,410,600 | 11/1946 | Cowles | 285/259 X |
| 2,686,066 | 8/1954 | Paquin | 285/93 |
| 2,810,594 | 10/1957 | Walsh et al. | 285/258 |
| 3,574,355 | 4/1971 | Oetiker | 285/39 |
| 4,544,187 | 10/1985 | Smith | 285/256 |
| 4,548,430 | 10/1985 | Haubert et al. | 285/256 |
| 4,948,178 | 8/1990 | Sauer | 285/242 |
| 5,207,460 | 5/1993 | Oetiker | 285/258 |
| 5,358,012 | 10/1994 | Kish | 138/109 |
| 5,387,016 | 2/1995 | Joseph et al. | 285/174 |
| 5,452,924 | 9/1995 | Kujawski | 285/305 |
| 5,524,939 | 6/1996 | Bartholomew | 285/242 |

FOREIGN PATENT DOCUMENTS

| 1014789 | 8/1952 | France | 285/256 |
| 2250399 | 4/1973 | Germany | 285/256 |
| 662843 | 3/1964 | Italy | 285/256 |
| 321238 | 6/1957 | Switzerland | 285/256 |
| 813661 | 5/1959 | United Kingdom | 285/256 |
| 1030485 | 5/1966 | United Kingdom | 285/256 |

Primary Examiner—Dave W. Arola
Attorney, Agent, or Firm—Jenkens & Gilchrist

[57] ABSTRACT

An assembly for attaching a new hose to an existing fitting includes an expandable split ring having an internal diameter less than the diameter of a preformed radially outwardly extending annular wall on the fitting, and a collar that is positionable over the fitting and the expandable split ring. The collar has a radially inwardly extending wall portion and a deformable sleeve portion. The split ring is positionable adjacent the annular wall on the fitting, and the radially inwardly extending wall portion of the collar is positionable in an abutting relationship with the expandable split ring. The deformable sleeve portion of the collar is inwardly deformable to provide retention of the collar, split ring, and hose on the fitting. The present invention solves the problem of the need for new fittings when modifying existing refrigeration systems to accept new refrigerants.

2 Claims, 3 Drawing Sheets

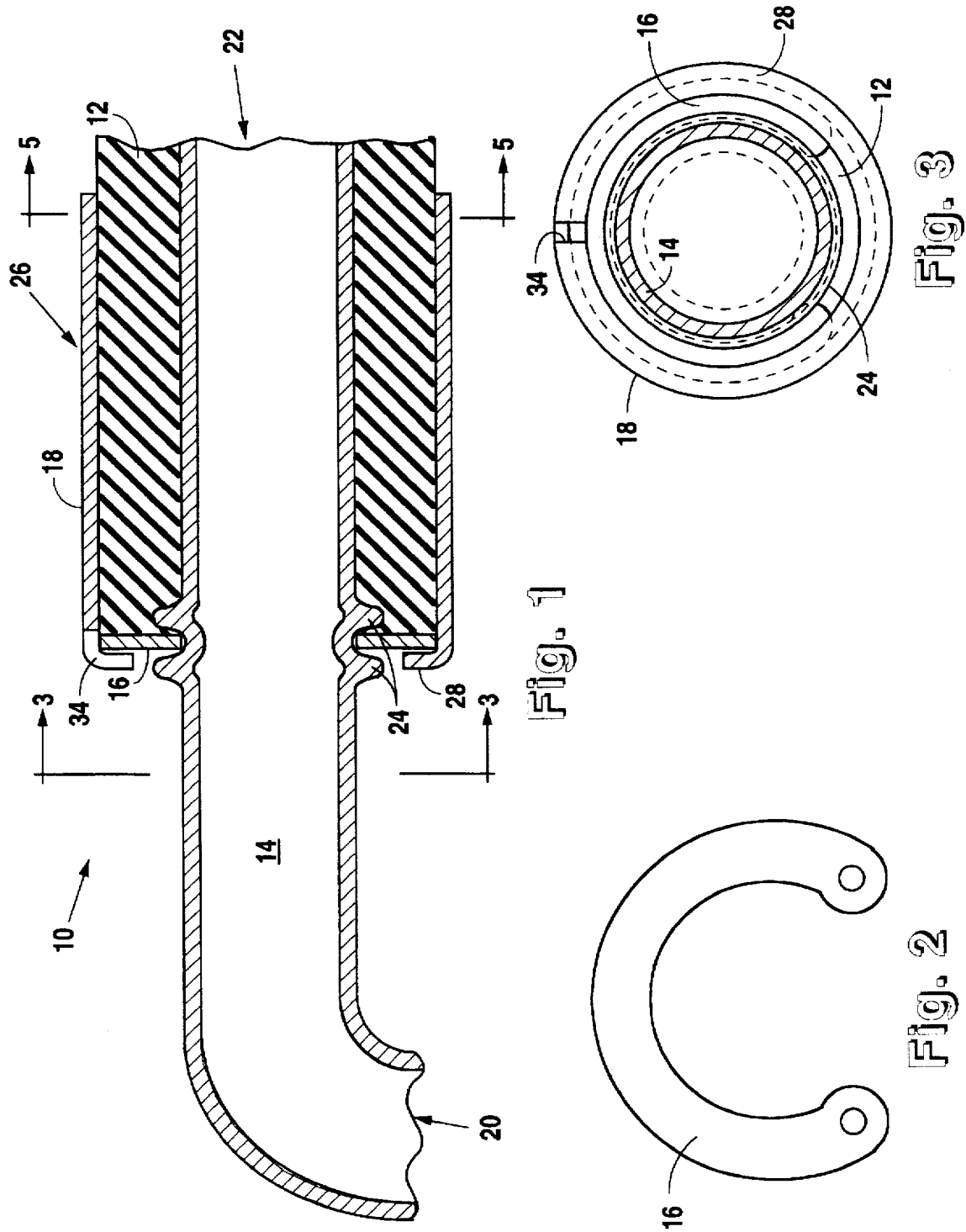

METHOD OF FORMING ATTACHMENT OF A HOSE TO A FITTING

BACKGROUND OF THE INVENTION

1. Technical Field

This invention relates generally to an assembly and method of using the assembly to attach a hose to a fitting, and more particularly to such an assembly and method directed to the replacement of hose on prevailing fittings.

2. Background Art

Recently imposed governmental regulations limit, or prohibit entirely, the production of ozone-depleting refrigerants such as R12 freon previously used in automotive air conditioning systems. New refrigerants have been developed and approved for use, but are not compatible with the hose and seal components of the older systems. New hose and seal materials and hose-to-fitting attachment arrangements, compatible with recently approved refrigerants, specifically R134A refrigerant, have been developed. Thus, at the present time two distinct and noncompatible refrigerant systems are in general use, heretofore requiring automotive air conditioning service, repair, or conversion facilities to maintain a large inventory of hoses and fittings for each system.

Exacerbating the problem of incompatible material components for the two refrigerant systems is the practice of using barbed tubes on the ends of the fittings in the older R12 system to provide retention of the hose on the tube end of the fitting. The molecular structure of the currently approved R134A refrigerant is much smaller than R12, and requires that hoses have an impermeable barrier layer, such as teflon, to prevent the loss of refrigerant through the wall of the hose. If the older fittings are used with new barrier layer hoses, the barbs on the tube ends perforate the barrier layer and destroy the sealing capability of hose.

To overcome this problem, either new fittings without barbed tube ends or modification of the old fittings by cutting off the barbed tube ends has been required. New fittings, while desirable, requires that a service or repair facility maintain a large inventory of fittings to satisfy the size, connection and configuration requirements of each original equipment and after-market manufacturer. This practice is prohibitively expensive, especially for smaller garages and shops, and new hose assemblies are not always available for older vehicles.

As described above, the older fittings have been reused by cutting off the barbed tube end of the fitting. This practice then requires that a new tube end be welded to the fitting, or that a specifically designed multiple component threaded adapter be secured to the remaining fitting. If welded, the services of a certified welder are required. Suitable adapters typically require that a ferrule be secured to the fitting after which a complex assembly comprising an o-ring seal, a connector body threaded at both ends, a tube nut, a hose nut, and a special barbed hose compression ring are assembled together. Since, the connecting end of fittings are not standardized, the use of adapters to reuse old fittings also requires a prohibitively large inventory of adapter components.

The present invention is directed to overcoming the problems set forth above. It is desirable to have an assembly whereby new hoses can be assembled on previously used fittings without cutting off the tube end of the fitting. It is also desirable to have a method of replacing the hose on a fitting without requiring welding or the use of complex, multiple component adapters. It is also desirable to have such an assembly that is economical and a method that is readily carried out with tools that are commonly available in a typical automobile air conditioning repair or service facility.

SUMMARY OF THE INVENTION

In accordance with one aspect of the present invention, an assembly for attaching a hose to a fitting includes an expandable ring having an internal diameter substantially equal to a predefined outer diameter of the fitting at a position adjacent a radially outwardly extending annular wall having a predefined outer diameter. The expandable ring has an outer diameter substantially equal to the outer diameter of the hose. The assembly also includes a collar having a deformable annular sleeve portion and a radially inwardly deformable wall portion disposed at one end of the sleeve portion. The deformable sleeve portion has an inner diameter substantially equal to the outer diameter of the hose, and the radially inwardly extending wall has an inner diameter greater than the predefined outer diameter of the radially outwardly extending annular wall of the fitting.

Other features of the assembly, comprising the present invention, for attaching a hose to a fitting include the expandable ring being a C-clip, the deformable annular sleeve of the collar having a plurality of slots extending through predefined portions of the sleeve at a position proximate an end of the sleeve spaced from the radially inwardly extending wall of the collar, and the radially inwardly extending wall of the collar having an opening formed at a predefined position in said wall.

In accordance with another aspect of the present invention, a method of attaching a hose to a fitting having at least one radially outwardly extending annular wall disposed intermediate the connection and tube ends of the fitting, includes installing a collar, having a deformable sleeve with an inner diameter substantially equal to the outer diameter of the hose and a radially inwardly extending wall at one end, over the tube end of the fitting, and moving the collar past the radially outwardly extending annular wall of the fitting to a position between the annular wall and the connection end of the fitting, with the inwardly extending wall of the collar facing the connection end of the fitting. An expandable ring, having an inner diameter substantially equal to the outer diameter of the fitting, is then inserted onto the fitting at a position adjacent the annular wall between the previously installed collar and the annular wall. A hose is then pushed onto the tube end of the fitting a distance sufficient to position the end of the hose adjacent the annular wall of the fitting. The deformable collar is then drawn towards the tube end of the fitting until the radially inwardly extending wall of the collar abuts the prepositioned expandable ring, the expandable ring abuts the annular wall of the fitting, and the deformable sleeve extends over a predefined portion of the hose. The assembled fitting, ring, collar and predefined portion of the hose is then placed in a press having predefined die elements disposed therein, and the die elements brought together at a predetermined rate and pressure whereby the sleeve of the collar is radially inwardly deformed to retain the hose and form an impermeable seal against the tube end of the fitting.

Other features of the method for attaching the hose to the fitting include radially orienting the collar with respect to the die members of the press to form, upon closure of the die members, longitudinal grooves in the deformable sleeve that extend from a position spaced from the radial wall end of the collar to an end of the collar spaced from the radial wall end, in radial alignment with a plurality of slots formed in the sleeve.

BRIEF DESCRIPTION OF THE DRAWINGS

FIG. 1 is a longitudinal section of the assembly embodying the present invention for attaching a hose to a fitting;

FIG. 2 is an elevational view of an expandable ring component of the assembly embodying the present invention for attaching a hose to a fitting;

FIG. 3 is a forward end view of a collar component of the assembly embodying the present invention for attaching a hose to a fitting, after deformation of the sleeve portion of the collar;

DETAILED DESCRIPTION OF THE INVENTION

Figure 4:
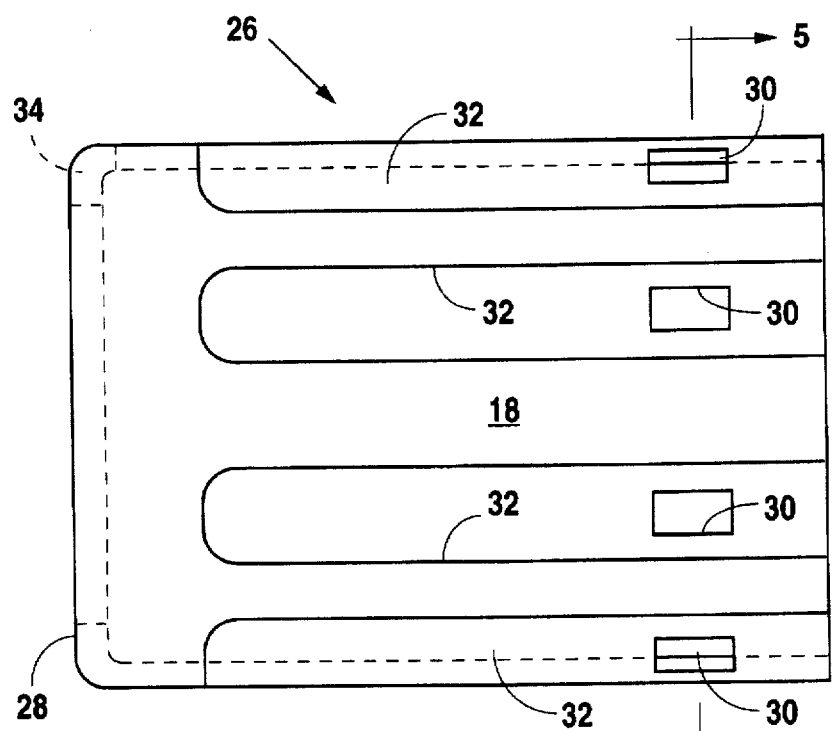
FIG. 4 is a side view of the collar component of the assembly embodying the present invention for attaching a hose to a fitting, after deformation of the sleeve portion of the collar.

An assembly for attaching a hose 12 to a fitting 14 is generally identified in FIG. 1 by the reference number 10. The assembly 10 includes an expandable ring 16, such as a conventional C-clip as shown in FIG. 2, and a collar 18. The fitting 14 typically has a forward, or component attachment, end 20 that has a face adapted to mate with a port on a compressor, condenser, or other element of an air conditioning system, and a nut adapted to mate with and attachably connect the fitting to the element. These components are generally arranged for a specific installation, and for the sake of clarity, are not shown in the drawings. The opposite, i.e., the rear or hose attachment, end 22 of the fitting 14 is adapted for attachment with the hose 12, and typically has one of four standard diameters adapted to receive ⁵⁄₁₆", ¹³⁄₃₂", ½", or ⅝" I.D. hoses, commonly identified respectively as Nos. 6, 8, 10 or 12 size hoses. The fitting 14 also typically has at least one, and often two, outwardly extending annular walls 24 usually formed by upsetting. The upset annular walls 24 provide what is known as a bead lock rings which, in the original structure, provides a forming surface against which a collar is crimped to provide retention of the hose on the fitting.

The present invention advantageously uses one of the bead lock rings 24 as a longitudinal reaction surface to prevent the rearward movement of the expandable ring 16 after it is installed on the fitting 14. The expandable ring 16 has an internal diameter that is less than the outer diameter of the annular wall 24 of the fitting 14 and is substantially equal to the diameter of the fitting 14 adjacent a single bead lock ring 24, or between a pair of bead lock rings 24 in double-upset ring arrangements. The expandable ring 16 is desirably a conventional C-clip, or has a construction similar to a conventional C-clip, as illustrated in FIG. 2. Thus, the expandable ring 16 can be installed on the fitting 14 by opening the mouth of the ring 16 and sliding it transversely over the outer surface of the fitting 14. The inner diameter of the expandable ring 16 is preferably equal to the outer diameter of the fitting 14 adjacent the upset rings 24, and the outer diameter of the expandable ring 16 is desirably equal to or, for ease of assembly, slightly less (for example, about 0.005") than the outer diameter of the hose 12.

The collar 18, preferably formed of steel, has a deformable sleeve portion 26 extending rearwardly from a radially inwardly extending wall 28 disposed at the forward end of the collar 18. The sleeve portion 26 has an inner diameter substantially equal to the outer diameter of the hose 12. The inner diameter of the radially inwardly extending wall 28 is preferably slightly greater, for example on the order of about 0.010 inch, than the outer diameter of the upset annular walls 24 of the fitting 14, to permit free passage of the collar 16 over the walls 24.

Figure 5:
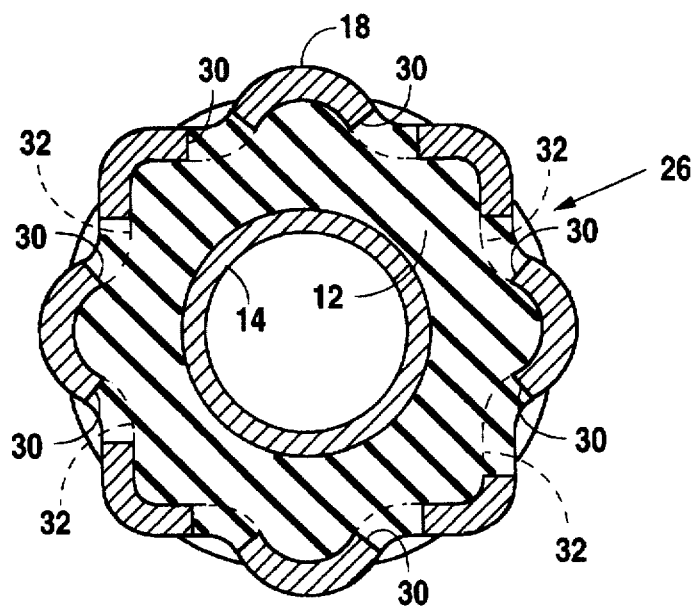
FIG. 5 is a rear end view of the collar component of the assembly embodying the present invention for attaching a hose to a fitting, after deformation of the sleeve portion of the collar.

If it is desired to use the crimping dies commonly used on the previous R12 systems, one or more slots 30 are preferably provided in the wall of the sleeve portion 26 at a position near the rearward end of the sleeve portion 26. When crimped by the forming dies commonly used on R12 fittings, a plurality of inwardly extending longitudinally directed grooves 32 are formed in the sleeve, as shown in FIGS. 3, 4 and 5. Desirably, the collar 18 is oriented in the crimping die so that the bottom, or deepest portion, of the grooves 32 correspond with the slots 30 which permit a small portion of the outer surface of the hose 12 to be deformed outwardly into the slots, thereby providing secure retention of the collar 18 to the hose 12, and assure sealing engagement of the hose 12 with the tube end 22 of the fitting 14. Desirably, four slots, each measuring about 0.4" by 0.2" are positioned so that they are spaced apart at 90° arcuate intervals at the bottom of the longitudinal grooves 26 after crimping. To provide an index for alignment of the slotted collar 18 with the dies in the crimping press, and provide a visual inspection port to assure proper positioning of the expandable ring 16 and end of the hose 12 within the collar 18, a small slot or opening 34 is desirably provided at a predetermined position in the radially inwardly extending wall 28 of the collar 14.

If desired, the deformable sleeve 26 of the collar 14 may be crimped by dies typically used in conjunction with the newer R134A systems which form what is generally known as a "bubble crimp" This type of crimp forms a plurality of inwardly deformed radial rings in the sleeve 26 which secure the collar 14 to the hose 12 with sufficient force to seal the hose 12 around the tube end 22 of the fitting 14. In this arrangement, the slots 30 in the sleeve 26 are generally not required.

In carrying out the method of attaching a hose to a fitting by use of the above described assembly 10, if old fittings are to be reused, the factory bead lock collar should be carefully removed to as not to damage the fitting. This can be done by cutting, preferably without the use of cutting torches or other thermal cutting devices. The cutting can be accomplished by conventional metal cutting tools such as a hack saw or high speed rotary cutter. On hose assemblies where the original collar was welded to the tube, the front or welded portion of the collar is ground and sized to provide an anchorage point for the expandable ring 16 and the new collar 18. Once the old collar is removed, the old hose is cut away from the fitting.

The reclaimed fitting 14 should be cleaned and inspected for damage, cracks, scratches and the like, and then measured to determine if resizing is required. Resizing, if required, is easily carried out using the external sizing dies or internal expansion dies of a conventional expander tool.

Figure 6:
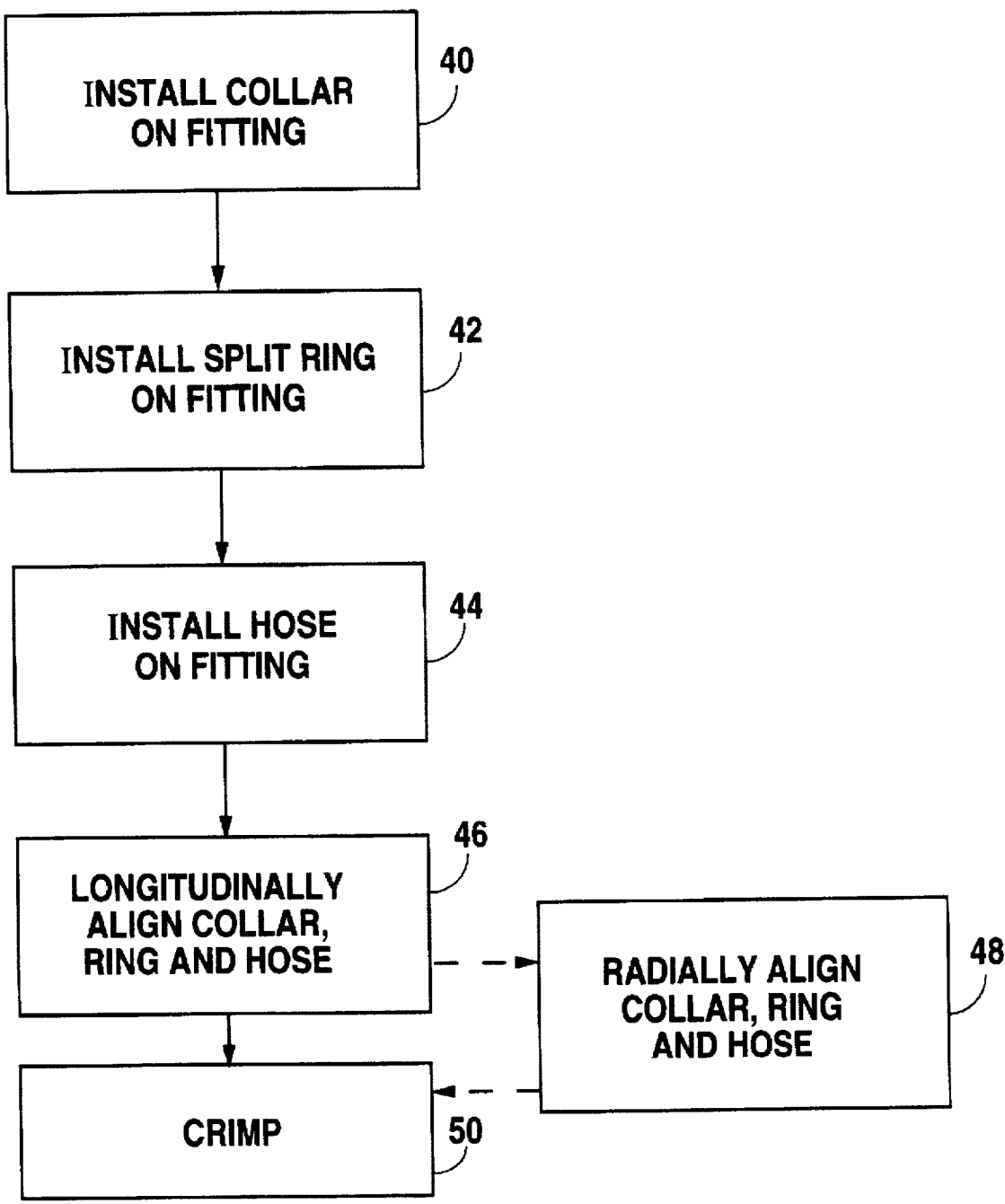
FIG. 6 is a block diagram of the method embodying the present invention for attaching a hose to a fitting.

The reclaimed fitting 14 is now ready for attachment to a hose 12 of the required composition in accordance with the method embodying the present invention, as illustrated diagrammatically in FIG. 6. First, as represented by block 40, the collar 18 is installed onto the fitting 14. This is accomplished by inserting the collar 18, inwardly extending wall 28 first, over the tube end 22 of the fitting 14, and then sliding the collar 18 forward over the upset annular wall, or walls, 24 to a position forward of the wall 24. Next, as indicated at block 42, the expandable ring 16 is inserted over the outer surface of the fitting 14 a position between the annular walls 24 if there are two walls, or adjacent the forward face of a single annular wall 24. As indicated at block 44, the hose 12 is then inserted over the tube end 22 of the fitting 14 and pushed onto the fitting 14 until the hose end abuts the rear surface of the annular wall 24. The assembly 10 and the hose 12 are then longitudinally aligned with the fitting 14, as indicated at block 46, by pulling the collar 18 rearwardly over the expandable ring 16 and the hose 12 until the inwardly extending wall 28 at the forward end of the collar 18 abuts the expandable ring 16. Correct positioning of the collar 18, the expandable ring 16, and end of the hose 12 with respect to the upset annular wall 24 of the fitting 14 can be assured by visual observation of the respective components through the inspection port 34. If longitudinal crimping dies are used for crimping the collar 18, the collar 18 should be rotated, as indicted at optional block 48, until the desired orientation of the slots 30 with respect to the crimping dies is achieved.

After alignment, the assembled collar 18, expandable ring 16, hose 12 and fitting 14 are placed in the crimping die and the die closed, as represented at block 50. Upon closure, the inwardly extending wall 28 of the collar 18 is crimped against the outer surface of the fitting 14. The inward deformation of portions of the deformable sleeve 26 form the longitudinal grooves 32 and compresses the hose 12 between the sleeve 26 and the fitting 14 to form a gas-tight seal between the hose 12 and the fitting 14 and provide retention of the hose 12 on the fitting 14. After crimping, the assembled hose 12 and fitting 14, containing the split ring 16 and collar 18, are removed from the die, and is ready for installation in an air conditioning system.

If a compact, portable press and die arrangement is used, the assembly of a new hose 12 to a fitting 14 connected to a system component, such as a compressor, may be carried out, in situ, in accordance with the present invention without detaching the fitting 14 from the system component.

Thus, it can be seen that the present invention provides an economical, relatively simple and efficient way to reuse fittings in automotive air conditioning systems, regardless of the previous refrigerant used in the system. Only four differently sized collars 18, and four differently sized expandable rings 16 are required to service fittings for all four hose sizes, regardless of fitting configuration.

If desired, the collar 18 may be conveniently formed by modification of the R12 system collars previously in widespread use. Such modification would only require that the inside diameter of the inwardly extending wall 28 of the collar 18 be expanded to provide clearance over the upset annular wall 24 of the fitting 14, and the provision of an inspection port 34 in the inwardly extending wall 28. If used in the longitudinal crimp configuration, the slots 30 should also be formed in the sleeve portion 26 of the collar 18.

Although the present invention is described in terms of illustrative examples and embodiments, those skilled in the art will recognize that changes in the illustrative examples may be made without departing from the spirit of the invention. Such changes are intended to fall within the scope of the invention. Other aspects, features and advantages of the present invention can be obtained by a study of the drawings and this disclosure.

What is claimed is:

1. A method for attaching a hose to a fitting having at least one radially outwardly extending annular wall intermediately disposed between a component attachment end and a hose attachment end of the fitting, comprising:

installing a collar, having a radially inwardly extending wall disposed at one end and a deformable sleeve portion having an inner diameter substantially equal to the outer diameter of said hose, on said fitting by inserting the collar over the hose attachment end of said fitting and moving the collar past the radially outwardly extending annular wall of the fitting to a position between the outwardly extending annular wall and the component attachment end of the fitting;

installing an expandable split ring having an inner diameter substantially equal to the outer diameter of the fitting, on said fixture at a position adjacent said outwardly extending annular wall of the fixture and between said installed collar and said outwardly extending annular wall;

inserting an open end of a hose over the hose attachment end of the fitting and moving said hose onto said fitting to a position at which the open end of the hose abuts the installed expandable split ring;

aligning said collar, ring and hose on the fitting by moving the collar toward the hose attachment end of fitting to a position at which the radially extending wall of the collar abuts the expandable split ring; and, crimping the deformable sleeve portion of the collar in a press having a plurality of defined die members to form a plurality of radially inwardly extending grooves each extending inwardly a distance sufficient to compress a portion of said hose between the deformed sleeve and the outer diameter of the fitting.

2. A method for attaching a hose to a fitting, as set forth in claim 1, wherein said collar includes a plurality of slots extending through the deformable sleeve portion, said crimping includes inserting the assembled fitting, split ring, and collar in a press having a plurality of defined die members, and said method includes aligning the collar with respect to said die members whereby said slots extending through the sleeve are aligned with said die members.

* * * * *